US009503938B2

(12) United States Patent
Wei et al.

(10) Patent No.: US 9,503,938 B2
(45) Date of Patent: Nov. 22, 2016

(54) HANDOVER METHOD AND SYSTEM BASED ON COGNITIVE TECHNOLOGY

(75) Inventors: Min Wei, Shenzhen (CN); Feng Li, Shenzhen (CN); Nan Zhao, Shenzhen (CN); Kaibo Tian, Shenzhen (CN); Aihua Peng, Shenzhen (CN); Senbao Guo, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 1039 days.

(21) Appl. No.: 13/698,134

(22) PCT Filed: Oct. 22, 2010

(86) PCT No.: PCT/CN2010/078034
§ 371 (c)(1),
(2), (4) Date: Nov. 15, 2012

(87) PCT Pub. No.: WO2011/143897
PCT Pub. Date: Nov. 24, 2011

(65) Prior Publication Data
US 2013/0053043 A1 Feb. 28, 2013

(30) Foreign Application Priority Data
May 17, 2010 (CN) .......................... 2010 1 0175521

(51) Int. Cl.
*H04W 36/00* (2009.01)
*H04W 36/26* (2009.01)

(52) U.S. Cl.
CPC ..... *H04W 36/0055* (2013.01); *H04W 36/0077* (2013.01); *H04W 36/26* (2013.01)

(58) Field of Classification Search
USPC ........................... 455/436–444; 370/331–334
See application file for complete search history.

(56) References Cited

U.S. PATENT DOCUMENTS

| 6,785,938 B1 | 9/2004 | Johansen, Jr. |
| 2003/0154581 A1 | 8/2003 | Jain et al. |

(Continued)

FOREIGN PATENT DOCUMENTS

| CN | 101296499 A | 10/2008 |
| CN | 101394207 A | 3/2009 |

(Continued)

OTHER PUBLICATIONS

International Search Report (Form PCT/ISA/210) for PCT/CN2010/078034, dated Feb. 24, 2011.

(Continued)

*Primary Examiner* — Marcus Hammonds
(74) *Attorney, Agent, or Firm* — Koppel, Patrick, Heybl & Philpott

(57) ABSTRACT

The disclosure discloses a handover method based on a cognitive technology. At least two working areas such as a Primary Working Area (PWA) and a Secondary Working Area (SWA), a RRM and a HOC are configured both in User Equipment (UE) and in a Base Station (BS); after receiving a handover request, according to the current radio environments, the PWA of the BS makes a handover negotiation with the neighboring BSs or with the neighboring BSs and the UE requesting handover, determines the communication parameters satisfying the handover request, and sends the determined communication parameters to the SWA of the BS and the SWA of the UE; the SWA of the BS and the SWA of the UE configure said communication parameters and notify the RRM of the BS after the configuration is finished; the RRM of the BS instructs the HOC of the BS and the HOC of the UE to activate the respective SWAs, and to perform the handover according to the communication parameters configured by the SWA. The disclosure also discloses a handover system based on the cognitive technology. The disclosure improves the resource utilization ratio and the quality of service in the current communication system.

18 Claims, 2 Drawing Sheets

(56) References Cited

U.S. PATENT DOCUMENTS

| | | | |
|---|---|---|---|
| 2008/0111282 A1 | 5/2008 | Xie et al. | 35/8 |
| 2009/0082057 A1* | 3/2009 | Hwang | H04W 52/242 455/522 |
| 2011/0003590 A1* | 1/2011 | Yoon | H04W 36/385 455/432.1 |
| 2011/0122840 A1* | 5/2011 | Kim | H04W 36/06 370/331 |
| 2012/0015659 A1* | 1/2012 | Kalyani | H04W 72/085 455/436 |

FOREIGN PATENT DOCUMENTS

| | | | |
|---|---|---|---|
| DE | 199 42 071 A1 | 2/1999 | 67/4 |
| DE | 10 20050240791 A1 | 6/2006 | 17/8 |
| DE | 10 2008 024 465 A1 | 11/2009 | 67/4 |
| EP | 1108115 B1 | 6/2001 | 3/11 |
| KR | 20090030453 A | 3/2009 | |
| WO | WO 2007 147 221 A1 | 12/2007 | 67/4 |
| WO | WO 2009 146 897 A2 | 12/2009 | 17/8 |
| WO | WO 2013/175 518 A2 | 11/2013 | 17/7 |

OTHER PUBLICATIONS

Office Action from German Patent Application No. 13/698,134 dated Apr. 4, 2016.

* cited by examiner

HANDOVER METHOD AND SYSTEM BASED ON COGNITIVE TECHNOLOGY

This is a National Stage Application of PCT/CN2010/078034 filed Oct. 22, 2010, published as WO 2011/143897 A1, and claiming priority from CN201010175521.2 filed May 17, 2010.

FIELD OF THE INVENTION

The disclosure relates to a handover technology in a radio communication system, in particular to a handover method and a handover system based on a cognitive technology.

BACKGROUND OF THE INVENTION

With the continuous development of the radio communication industry, more and more users choose to use radio communication; the current radio communication is not limited to voice communication, while wider data service communication is especially a direction for the development of the radio communication system, for example, video, business or commercial data and the like. With the gradually enlarged radio communication scale, the lack of radio spectrum resource is highlighted. Current spectrum allocation system usually refers to fixed allocation, namely allocating fixed spectrum resources for authorized users, this further intensifies the tight situation of the spectrum resources. For example, the authorized users do not always occupy the allocated spectrum in accordance with a lot of actually observed results in a world wide, namely a part of spectrum is always idle on certain time, space and frequency band and no matter adopting what kind of radio accessing technologies. This provides possibilities for effectively utilizing the idle spectrum resources and providing paid services for non-authorized users, so that the utilization of the spectrum is improved and the pressure of the spectrum resource is reduced. Cognitive Radio (CR) technology is developed under the background.

When the cognitive system is required to perform handover (HO) due to demand of service, for example the demand of transmission of video or large-scale commercial data, or change of signal channel quality, the existing method has the problems of slow handover speed, easy disconnection and the like. The main reasons of above problems are as follows: slow spectrum sensing, when the system is required to handover and no new spectrum resource is sensed, the handover speed is slow; when the system is handed over, the coordination of equipment such as terminal, base station, gateway and the like (including software, hardware and signaling) goes wrong thereby causing disconnection.

How to perform the handover fast and smoothly is a problem urgently needed to solve.

SUMMARY OF THE INVENTION

In view of this, one purpose of the invention is to provide a handover method and handover system based on a cognitive technology, so that the sensed and currently unused frequency band resources can be allocated for user equipment when the load of the frequency band configured by the base station is large or the demand of the frequency band of the user equipment is large, thereby improving the performance of the communication system.

In order to achieve the purpose, the technical solution of the invention is realized by:

a handover method based on a cognitive technology, wherein at least two working areas including a primary working area and a secondary working area, a Radio Resource Management (RRM) and a Handover Controller (HOC) are both configured in a user equipment and in a base station, and the method comprises:

after receiving a handover request, according to current radio environments, the primary working area of the base station making a handover negotiation with a neighboring base station or with a neighboring base station and the user equipment requesting handover, determining a Radio Access Technology (RAT) and communication parameters satisfying the handover request, and sending the determined communication parameters, or the determined communication parameters and communication software corresponding to the RAT, to the secondary working area of the base station and the secondary working area of the user equipment;

the secondary working area of the base station and the secondary working area of the user equipment configuring the communication parameters, or installing communication software corresponding to the RAT and configuring the communication parameters, and notifying the RRM of the BS after the configuration is finished; and instructing the HOC of the base station and the HOC of the user equipment by the RRM of the base station to activate the respective secondary working areas, and to perform a handover according to the communication parameters configured by the secondary working area.

Preferably, a resource database is further configured in the base station, the resource database is configured to store unused spectrum resource obtained by statistic, and radio communication technology (RAT) parameters corresponding to the unused spectrum resource; the base station obtains the unused spectrum resource from a neighboring base station and itself; there is at least one of the following data further maintained in the resource database: use equipment information, unused spectrum strategy, load situations of respective carriers, quality of service and fee standard.

Preferably, the method further comprises:

making a handover negotiation by the primary working area of the base station based on quality of service of requested service, current load situation, interference on other carrier frequencies caused by a carrier frequency allocated for performing the handover for the user equipment, fee, supported RAT and carrier frequency requirement of the user equipment; and the primary working area of the base station determining carrier frequency information allocated for the user equipment and determining corresponding RAT and configured parameters for the user equipment.

Preferably, after performing the handover according to the communication parameter configured by the secondary working area, the method further comprises:

stopping use of the primary working area of the user equipment;

or, maintaining a usage state of the primary working area of the user equipment.

Preferably, the method further comprises that:

prestoring each RAT communication software by the user equipment;

when determining that the user equipment supports the RAT obtained after the handover, sending identification information of the RAT to the secondary working area of the user equipment by the primary working area of the base station; calling and installing a communication software corresponding to the RAT by the secondary working area of the user equipment according to the identification information of the RAT.

Preferably, when detecting that the user equipment is required to perform a handover, the RRM of the base station sends a handover request to the primary working area of the base station;

or, when the RRM of the user equipment detects that the user equipment is required to perform a handover, the RRM of the user equipment sends a handover request to the primary working area of the base station through the RRM of the base station.

A handover system based on a cognitive technology comprises a user equipment and a base station, wherein at least two working areas including a primary working area and a secondary working area, a Radio Resource Management (RRM) and a Handover Controller (HOC) are configured both in the user equipment and in the base station, wherein the primary working area of the base station is configured, after receiving a handover request, to make a handover negotiation with a neighboring base station or with a neighboring base station and a user equipment requesting a handover according to current radio environments, to determine a Radio Access Technology (RAT) and communication parameters satisfying the handover request, and to send the determined communication parameters, or the determined communication parameters and communication software corresponding to the RAT, to the secondary working area of the base station and the secondary working area of the user equipment;

the secondary working area of the base station is configured to configure the communication parameters, or install the communication software corresponding to the RAT and configure the communication parameters, and notify the RRM of the base station after the configuration is finished;

the secondary working area of the user equipment is configured to configure the communication parameters and notify the RRM of the base station through the RRM of the user equipment after the configuration is finished;

the RRM of the base station is configured to instruct the HOC of the base station and the HOC of the user equipment to activate the respective secondary working areas, and perform the handover according to the communication parameters configured by the secondary working area.

Preferably, the base station is further configured with a resource database; the resource database is configured to store unused spectrum resource obtained by statistic, and RAT parameters corresponding to the unused spectrum resource; the base station is configured to obtain the unused spectrum resource from a neighboring base station and itself; and there is at least one of the following data maintained in the resource database: use equipment information, unused spectrum strategy, load situations of respective carriers, quality of service and fee standard.

Preferably, the primary working area of the base station is configured to, make a handover negotiation based on quality of service of requested service, current load situation, interference on other carrier frequencies caused by a carrier frequency allocated for performing the handover for the user equipment, fee, supported RAT and carrier frequency requirement of the user equipment; and the primary working area of the base station is configured to determine carrier frequency information allocated for the user equipment, communication software required by the RAT and the configured parameters thereof.

Preferably, the user equipment is configured to prestore communication software corresponding to each RAT;

the primary working area of the base station is configured, when the primary working area of the base station determines that the user equipment supports the RAT obtained after the handover, to send identification information of the RAT to the secondary working area of the user equipment; and the secondary working area of the user equipment is configured to call and install a software corresponding to the RAT according to the identification information of the RAT.

Preferably, the RRM of the base station is configured to send a handover request to the primary working area of the base station when the RRM of the base station detects that the user equipment is required to perform a handover;

or, the RRM of the user equipment is configured to send a handover request to the primary working area of the base station through the RRM of the base station when the RRM of the user equipment detects that the user equipment is required to perform a handover.

In the disclosure, when the load of the frequency band configured by the base station is large or the bandwidth demand of some user equipments is large, the unused frequency band resources detected by the base station are allocated to corresponding user equipment; as the unused frequency band resources are allocated to the user equipment, the user equipment is required to support the corresponding RAT; in this way, as for the user equipment that does not support the corresponding RAT, the corresponding RAT communication software and corresponding configuration parameters are required to send to the user equipment, so that the handover is performed according to resources allocated for the currently handover by the base station, after the user equipment is installed with the corresponding RAT communication software. In the disclosure, the primary working area and the secondary working area are configured both in the base station and in the user equipment, and when the RAT communication software is required to be installed and/or relevant configuration is required to be performed, the RAT communication software is installed in the secondary working area, and/or the relevant configuration parameters are configured in the secondary working area, and the handover is further carried out after the installation and/or configuration are finished, in this way, the current communication service of the user equipment is not influenced, and the users do not have any communication interruption feeling, so that the soft handover is realized. The disclosure ensures full utilization by the base station to the unused frequency band, ensures the communication demand of users, improves the resource utilization of the communication system, and improves the quality of service of the communication system.

DETAILED DESCRIPTION OF THE EMBODIMENTS

The main idea of the disclosure is that: utilizing current cognitive radio technology to make full use of the unused frequency band resources in the currently sensed communication system, and to allocate the sensed unused frequency band resources to the current user equipment having the handover demand, so that the utilization ratio of the radio resource is ensured, the successful handover of the user equipment is ensured, and the communication service demand of the user equipment is ensured.

In order to make the purpose, technical scheme and advantages of the disclosure clearer, the disclosure is described below with reference to the accompanying drawings and embodiments in detail.

Figure 1:
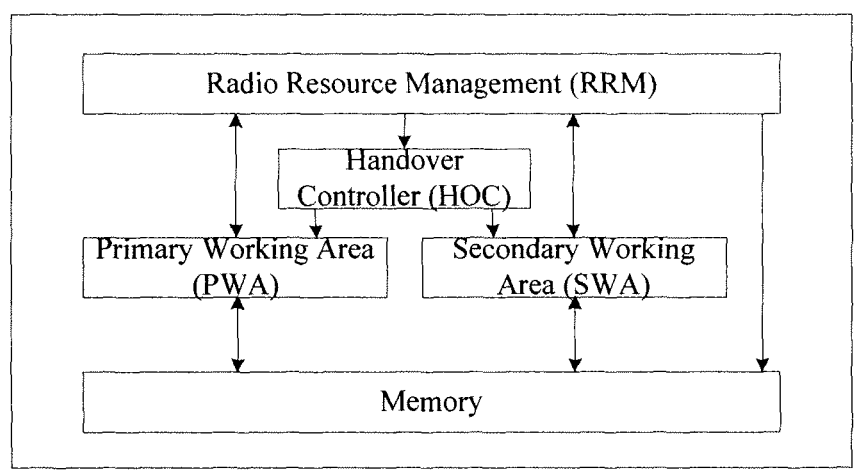
FIG. 1 shows a structural diagram of functional modules of equipment supporting the Cognitive Radio technology.

In the disclosure, the base station and/or the user equipment support the current cognitive radio technology, namely the base station and/or the user equipment can sense the unused frequency band resources in the communication system. To be noted, the cognitive radio technology belongs to the traditional art, thus, it is only required to install corresponding application software in the corresponding equipment. The implementation details thereof do not need to be described redundantly. The FIG. 1 shows the structural diagram of the functional module of the equipment supporting the cognitive radio technology of the disclosure. As shown in the FIG. 1, in the disclosure, the base station and/or the user equipment supporting the cognitive radio technology are firstly divided in terms of working areas, namely, at least two working areas, a HOC (Handover Controller) and a RRM (Radio Resource Management) are obtained by dividing the inside of the baseband supporting the Cognitive Radio System (CRS). That's to say, at least two working areas, one HOC and one RRM are obtained by performing dividing operation at the baseband of the User Equipment (UE) and the Base Station (BS). In the at least two working areas, one of them is a PWA (Primary Working Area), and the other one is a SWA (Secondary Working Area), and the at least two working areas are controlled by the RRM and the HOC. The RRM and HOC of the BS are RRM and HOC at the network side, and the RRM and HOC of the UE are RRM and HOC at the UE side. RRM is responsible for, including but not limited to, connection of air interface, encoding and translation of information, searching and measuring of unused frequency band resource and the like. The HOC is responsible for concrete controlling handover process, including adjustment of parameters and installation of corresponding communication software, for example RAT communication software and the like. The double-head arrows in the FIG. 1 show the control and data directions. The HOC is controlled by the RRM to be responsible for the concrete controlling handover process; the RRM at least generates triggering signals for starting work and stopping work of PWA and SWA, and controlling signals of reading, chip selection, address and the like from PWA and SWA to the Memory, and controls the data direction from the Memory to the PWA and SWA. The PWA and SWA generate the feedback signals of PWA and SWA to the RRM respectively; the RRM further generates the controlling signals of writing, chip selection, address and the like from RRM to the Memory, and the like.

In the disclosure, the responsibility of the PWA is to support the current network communication; and the responsibility of the SWA in the UE is as follows: when the UE is Cognitive Radio (CR) equipment, the SWA in the UE is directly controlled by the RMM to download and install RAT communication software corresponding to the allocated unused resources, and realizes the configuration of the relevant parameters; when the user equipment is Multi-Radio (MR) equipment, according to the software or software number required to be installed and determined by the BS, the SWA in the UE installs the corresponding communication software prestored in the user equipment; the SWA is used as the redundancy of the PWA, when the PWA fails due to some reasons, the SWA will replace the PWA to support the current communication service, so as to ensure that the current communication service can be performed smoothly. In this way, when the PWA works normally, the SWA is in a half dormancy state, namely, the SWA can normally monitor the state of the PWA (having a monitoring function).

Figure 2:
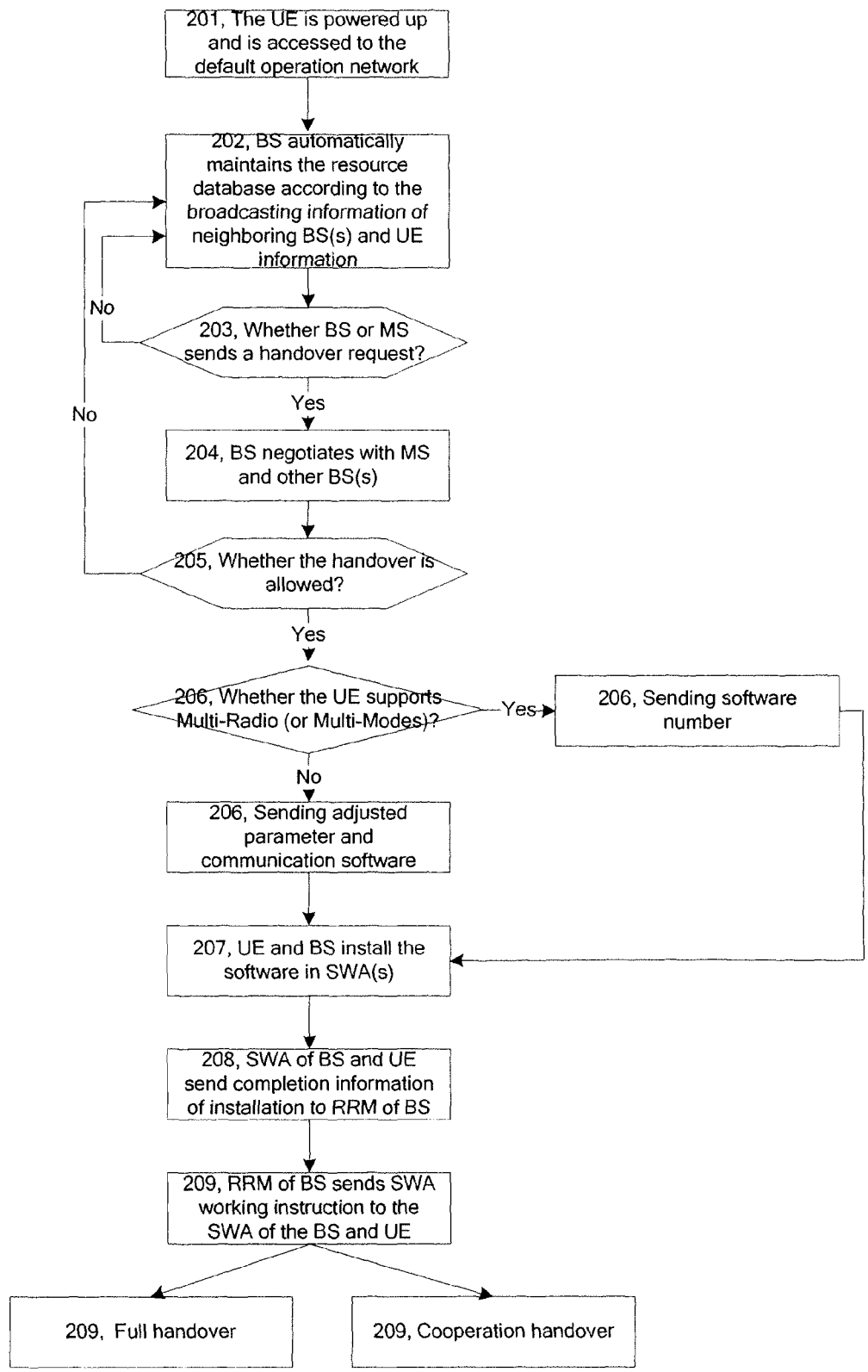
FIG. 2 shows a flowchart of a handover method based on the cognitive technology of the disclosure.

FIG. 2 shows the flowchart of the handover method based on the cognitive technology of the disclosure; the handover method shown by FIG. 2 is the universal handover flow of the disclosure; the handover method is suitable for the situation that the UE is the MR, and is also suitable for the situation that the UE is a CR terminal. Under the premise that the UE is the MR terminal, the handover method of the disclosure is further suitable for the situation that the initial access communication network is the Global System for Mobile Communication (GSM) network, and is also suitable for the situation that the initial access communication network is the Universal Mobile Telecommunications System (UMTS) network; meanwhile, is also suitable for the situation that the initial access network is the Long Term Evolution (LTE) network. As for the application example, since the implementation flow thereof is only based on the difference of the accessed networks, no concrete examples are given out specially.

As shown in FIG. 2, the handover method based on the cognitive technology of the disclosure specifically comprises the following steps:

Step 201, on a start-up phase, according to the current default communication parameter setting, UE is automatically loaded to a certain default operation network and develops a voice or data service.

For example, when the current communication configuration is a GSM network, the UE will automatically search the GSM network signal and resides to the GSM network. On the start-up phase of the UE, the UE performs search and synchronization on the default network system and is finally accessed to the default network system.

The UE can be the MR UE or the CR UE. The mobile network configured by default can also be the UMTS or LTE network.

Step 202, the cognitive BS automatically maintains the established resource database according to the UE information and the resource change information of the neighboring BS(s); and the cognitive BS automatically maintains the established resource database according to the broadcasting information provided by respective neighboring BS(s);

the resource database is used for storing the unused spectrum resources obtained by statistic and the corresponding RAT parameter information. The cognitive BS obtains the information of the unused spectrum resources from the neighboring BS(s) and itself; there is further at least one of the following data maintained in the resource database: relevant information of UE, unused spectrum strategy, load situations of respective carriers, and quality of service of relevant service (or business). In the disclosure, the purpose of the resource database is to allocate the sensed unused spectrum to the UE under the BS; in this way, the cognitive BS is required to maintain the relevant frequency band resources and the RAT communication software corresponding to the frequency band resources and the like, and is further required to store the capability information of the relevant UE, for example, the information of the type of the UE or whether to support the relevant RAT technologies and the like. When the current resource is tight or the bandwidth resource required by the UE is large, the cognitive BS allocates the sensed and unused frequency band resources to the corresponding UE by utilizing current resource allocation situation. The persons skilled in the art should understand that it is easy to realize the operation of storing above relevant information in above resource database.

The broadcasting information of the neighboring BS(s) includes the information that the resource of the serving cell is changed, and the cognitive BS is informed about the information that the relevant resource is changed. In the disclosure, the information of the resource database is mainly derived from two parts: derived from the relevant source change information sent by the neighboring BS(s) of the cognitive BS; derived from the unused frequency band resource information searched by the cognitive BS itself.

Step 203, when the spectrum resource is required to be changed due to the service (or business), the corresponding handover request is generated.

The handover request is from the cognitive BS or the UE. The reason of the handover request is that the current communication condition cannot meet the requirement due to traffic, load situation, quality of service or interference from other systems. At the cognitive BS, the handover request is initiated by RRM at the network side, namely by the RRM of the BS, and the RRM notifies the PWA of the BS through a triggering way. Here, the triggering can be generated by a hardware circuit, the hardware circuit generates the triggering signal to an interruption input port of corresponding hardware of the PWA, and the PWA works under an interruption mode; the triggering can also be generated by software, the software generates corresponding triggering messages to be loaded to the PWA through a message flow mechanism. At the UE, the handover request is initiated by the RRM at the UE side, and is sent to the PWA through the uplink control channel.

In the disclosure, the main reasons for generating the handover request are as follows: that the traffic (or the quantity of the services) is enlarged, namely the number of the UE accessed into the cognitive BS is increased, and the bandwidth required by the communication service of the UE is enlarged; the traffic is reduced, namely the number of the UE accessed into the cognitive BS is reduced, and the required bandwidth of the communication service is reduced; and the current channel quality is changed, for example, the current channel quality becomes worse, so that the performance of the current communication service is degraded. Therefore, according to the situation of the current channel load, the UE sends a request for changing the spectrum resource to the RRM of the cognitive BS through the uplink control channel, and the RRM of the BS sends the handover request by itself.

Step 204, after the RRM of the BS receives the handover request, the RRM of the BS makes a negotiation with the other BS(s) (BS(s) adjacent to the cognitive BS) and/or UE.

In the disclosure, the primary working area of the cognitive BS makes a handover negotiation based on the quality of service of the requested service, current load situation, the interference on other carrier frequencies caused by the carrier frequency(s) allocated for performing the handed over for the user equipment, the fee (or tariff), RAT and carrier frequency requirement of the UE. In the step, the cognitive BS will determine the required resource situation of the UE according to the information such as subscription information of the UE to be handed over (or switched), the frequency band resource situation required by the service for which the hand over is to be performed, the QoS (Quality of Service) information of the service, capability of the UE and the like, namely will make a negotiation about allocation strategy of the resources.

The way of negotiation is totally the same as the existing way of resource negotiation, namely, as long as the relevant negotiation strategy is configured for the cognitive BS, the cognitive BS can execute the corresponding negotiation strategy. The disclosure does not make the limitation on the corresponding negotiation strategy, as long as the relevant RAT can be determined according to the currently sensed and unused frequency band, and the used RAT or relevant RAT communication software can be sent to the UE, so that the UE can make use of the unused frequency band resource.

That's to say, when the cognitive BS allocates the unused frequency band resource for the UE, and when the UE supports the corresponding RAT of the unused frequency band, the UE is informed about the RAT to be used, while when the UE does not support the RAT, the RAT communication software and the relevant configuration parameters are required to be sent to the UE, so that the UE can make use of the unused frequency band to perform communication.

In Step 205, the allocated resource information is determined for the UE according to the negotiation result, when the unused frequency band is related, the corresponding RAT of the unused frequency band is still required to be determined, namely the communication system which the unused frequency band belongs to is determined, and what kind of RAT communication software is required to make use of the unused frequency band. The judging operation is performed for the negotiation result, if the handover is allowed, the Step 206 is executed, otherwise, the Step 202 is executed, and the resource is sensed again.

Step 206, the cognitive BS sends the corresponding communication software to the UE through the downlink control channel.

In order to reduce the communication traffic, under the condition that the UE is the MR UE, RAT communication software of respective available modes are prestored in the UE, and are numbered (identifying quantization manner), in this way, the UE is not required to download the new communication software and the cognitive BS is only required to transmit the serial number of the corresponding communication software on the downlink control channel. In the disclosure, it is supposed that the MR UE supports all RATs, and the cognitive BS is only required to send the corresponding RAT identification information (such as the serial number of the communication software) to the UE. Therefore the transmission overhead and resources can be reduced to the utmost extent. However, as for the CR user, due to the complexity of the resource, the communication software cannot be prestored, and the cognitive user must download the communication software from the BS end.

Step 207, the UE and the BS install the communication software provided by the BS at the respective SWAs.

The SWAs of the BS and the UE perform parameter adjustment and installation of the communication software except communication work. After the parameter adjustment and installation of the communication software (under CR condition) of the SWA of the UE are finished, the RRM of the UE side is informed, and the RRM notifies the RRM at the network side through the uplink control channel. After the SWA of the cognitive BS finishes the parameter adjustment and installation of the communication software (under CR condition), the RRM at the network side is directly notified (the information is sent through software or hardware). After the RRM at the network side receives information that both the BS and the MS finish the parameter adjustment and the installation of the communication software (under CR condition), the RRM at the network side sends a handover instruction (the content includes but is not limited to the starting time) to the HOC. At the cognitive BS side, the RRM directly notifies the HOC (sending information through software or hardware); at the UE side, the RRM at the network side notifies the HOC at the UE side through the downlink control channel. Respective HOC finishes the handover work according to the handover instruction and the local time.

In the disclosure, the contact of the UE's SWA to the outside are all performed by the RRM of the UE.

Step 208, the respective SWA of the UE and the cognitive BS sends completion information that the installation of the communication software is finished to the RRM of the BS.

The UE sends the completion information to the RRM of the BS through the uplink control channel. The SWA of the BS sends the completion information to the RRM of the BS through the software or the hardware.

Step 209, after the installation of the communication software is finished, under the uniform control of the HOC, namely, the UE sends a triggering instruction to the corresponding assembly, so that the new communication software can start to work. At this time, the old communication software in the PWA has two working states: a) the old communication software is uninstalled, the original working area PWA is set as the SWA, and the original SWA is set as the PWA, so that the handover work is finished. b) The old communication software continues to work, at this time, the UE corresponds to double-RAT working mode.

In this way, the handover of the UE is realized by switching the UE to the SWA of the UE, and implementing the communication service with the cognitive BS.

The handover system based on the cognitive technology of the disclosure comprises UE and BS (cognitive BS); at least two working areas including a PWA and a SWA, a RRM and a HOC are configured both in the UE and in the BS; the structures of the at least working areas including the PWA and the SWA in the UE and the BS, the RRM and the HOC can refer to FIG. 1.

In the above, the PWA of the BS is configured to make a handover negotiation with the neighboring BS(s), or with the neighboring BS(s) and the UE requesting handover, according to the current radio environments after receiving a handover request, determine the communication parameters satisfying the handover request, and send the determined communication parameters to the SWA of the BS and the SWA of the UE;

the SWA of the BS is configured to configure the communication parameters and notify the RRM of the BS after the configuration is finished;

the SWA of the UE is configured to configure the communication parameters and notify the RRM of the BS through the RRM of the UE after the configuration is finished;

the RRM of the BS is configured to instruct (or inform or notify) the HOC of the BS and the HOC of the UE to activate the respective SWA, and to perform the handover according to the communication parameters configured by the SWA.

The BS is further configured with a resource database; the resource database is configured to store the unused spectrum resource obtained by statistic, and radio communication technology RAT corresponding to the unused spectrum resource; the BS obtains the unused spectrum resource from neighboring BS(s) and itself; there is at least one of the following data maintained in the resource database: UE information, unused spectrum strategy, load situations of respective carriers, quality of service and fee (or tariff or charges).

The PWA of the BS performs the handover negotiation based on the quality of service of the requested service, current load situation, interference on other carrier frequencies caused by the carrier frequency allocated for performing the handed over for user equipment, fee, supported RAT and carrier frequency requirement of the user equipment UE; and the primary working area of the base station determines carrier frequency information allocated for the user equipment, communication software required by the RAT and the configured parameters thereof.

The UE prestores communication software corresponding to respective RAT;

when the PWA of the BS determines that the UE supports the RAT obtained after the handover, the PWA of the BS sends identification information of the RAT to the SWA of the UE; and the SWA of the UE calls and installs the RAT communication software according to the identification information of the RAT.

When the RRM of the BS detects that the UE is required to perform the handover, the RRM of the BS sends a handover request to the PWA of the BS;

or, when the RRM of the UE detects that the UE is required to perform the handover, the RRM of the UE sends a handover request to the PWA of the BS through the RRM of the BS.

The handover system based on the cognitive technology of the disclosure is suitable for the radio communication systems such as GSM, LTE, UMTS and the like.

The above is only the preferred embodiment of the disclosure and not intended to limit the protection scope of the disclosure.

What is claimed is:

1. A handover method based on a cognitive technology, wherein at least two working areas including a primary working area and a secondary working area, a Radio Resource Management (RRM) and a Handover Controller (HOC) are both configured in a user equipment and in a base station, and the method comprises:

after receiving a handover request, according to radio environments, the primary working area of the base station making a handover negotiation with a neighboring base station or with a neighboring base station and the user equipment requesting handover, determining a Radio Access Technology (RAT) and communication parameters satisfying the handover request according to sensed and unused spectrum resource, and sending the determined communication parameters and communication software corresponding to the RAT to the secondary working area of the base station and the secondary working area of the user equipment;

the secondary working area of the base station and the secondary working area of the user equipment installing the communication software corresponding to the RAT and configuring the communication parameters, and notifying the RRM of the BS after the configuration is finished; and instructing the HOC of the base station and the HOC of the user equipment by the RRM of the base station to activate the respective secondary working areas, and to perform a handover according to the communication parameters configured by the secondary working area.

2. The method according to claim 1, wherein a resource database is further configured in the base station, the resource database is configured to store unused spectrum resource obtained by statistic, and radio communication technology (RAT) parameters corresponding to the unused spectrum resource; the base station obtains the unused spectrum resource from a neighboring base station and itself; there is at least one of the following data further maintained in the resource database: use equipment information, unused spectrum strategy, load situations of respective carriers, quality of service and fee standard.

3. The method according to claim 2, further comprising:
making a handover negotiation by the primary working area of the base station based on quality of service of requested service, current load situation, interference on other carrier frequencies caused by a carrier frequency allocated for performing the handover for the user equipment, fee, supported RAT and carrier frequency requirement of the user equipment; and
the primary working area of the base station determining carrier frequency information allocated for the user equipment and determining corresponding RAT and configured parameters for the user equipment.

4. The method according to claim 3, wherein, after performing the handover according to the communication parameter configured by the secondary working area, the method further comprises:
stopping use of the primary working area of the user equipment;
or, maintaining a usage state of the primary working area of the user equipment.

5. The method according to claim 4, wherein, when detecting that the user equipment is required to perform a handover, the RRM of the base station sends a handover request to the primary working area of the base station;
or, when the RRM of the user equipment detects that the user equipment is required to perform a handover, the RRM of the user equipment sends a handover request to the primary working area of the base station through the RRM of the base station.

6. The method according to claim 3, wherein the method further comprises:
prestoring each RAT communication software by the user equipment;
when determining that the user equipment supports the RAT obtained after the handover, sending identification information of the RAT to the secondary working area of the user equipment by the primary working area of the base station; calling and installing a communication software corresponding to the RAT by the secondary working area of the user equipment according to the identification information of the RAT.

7. The method according to claim 6, wherein, when detecting that the user equipment is required to perform a handover, the RRM of the base station sends a handover request to the primary working area of the base station;
or, when the RRM of the user equipment detects that the user equipment is required to perform a handover, the RRM of the user equipment sends a handover request to the primary working area of the base station through the RRM of the base station.

8. The method according to claim 3, wherein, when detecting that the user equipment is required to perform a handover, the RRM of the base station sends a handover request to the primary working area of the base station;
or, when the RRM of the user equipment detects that the user equipment is required to perform a handover, the RRM of the user equipment sends a handover request to the primary working area of the base station through the RRM of the base station.

9. The method according to claim 2, wherein, when detecting that the user equipment is required to perform a handover, the RRM of the base station sends a handover request to the primary working area of the base station;
or, when the RRM of the user equipment detects that the user equipment is required to perform a handover, the RRM of the user equipment sends a handover request to the primary working area of the base station through the RRM of the base station.

10. The method according to claim 1, wherein, when detecting that the user equipment is required to perform a handover, the RRM of the base station sends a handover request to the primary working area of the base station;
or, when the RRM of the user equipment detects that the user equipment is required to perform a handover, the RRM of the user equipment sends a handover request to the primary working area of the base station through the RRM of the base station.

11. A handover system based on a cognitive technology, comprising:
a user equipment and a base station, wherein at least two working areas including a primary working area and a secondary working area, a Radio Resource Management (RRM) and Handover Controller (HOC) are configured both in the user equipment and in the base station, wherein;
the primary working area of the base station is configured, after receiving a handover request, to make a handover negotiation with a neighboring base station or with a neighboring base station and a user equipment requesting a handover according to current radio environments, to determine a Radio Access Technology (RAT) and communication parameters satisfying the handover request according to currently sensed and unused spectrum resource, and to send the determined communication parameters and communication software corresponding to the RAT, to the secondary working area of the base station and the secondary working area of the user equipment;
the secondary working area of the base station is configured to install the communication software corresponding to the RAT and configure the communication parameters, and notify the RRM of the base station after the configuration is finished;
the secondary working area of the user equipment is configured to configure the communication parameters and notify the RRM of the base station through the RRM of the user equipment after the configuration is finished;
the RRM of the base station is configured to instruct the HOC of the base station and the HOC of the user equipment to activate the respective secondary working areas, and perform the handover according to the communication parameters configured by the secondary working area.

12. The system according to claim 11, wherein the base station is further configured with a resource database; the resource database is configured to store unused spectrum resource obtained by statistic, and RAT parameters corresponding to the unused spectrum resource; the base station is configured to obtain the unused spectrum resource from a neighboring base station and itself; and there is at least one of the following data maintained in the resource database:

use equipment information, unused spectrum strategy, load situations of respective carriers, quality of service and fee standard.

13. The system according to claim 12, wherein the primary working area of the base station is configured to, make a handover negotiation based on quality of service of requested service, current load situation, interference on other carrier frequencies caused by a carrier frequency allocated for performing the handover for the user equipment, fee, supported RAT and carrier frequency requirement of the user equipment; and the primary working area of the base station is configured to determine carrier frequency information allocated for the user equipment, communication software required by the RAT and the configured parameters thereof.

14. The system according to claim 13, wherein the user equipment is configured to prestore communication software corresponding to each RAT;

the primary working area of the base station is configured, when the primary working area of the base station determines that the user equipment supports the RAT obtained after the handover, to send identification information of the RAT to the secondary working area of the user equipment; and the secondary working area of the user equipment is configured to call and install a software corresponding to the RAT according to the identification information of the RAT.

15. The system according to claim 14, wherein the RRM of the base station is configured to send a handover request to the primary working area of the base station when the RRM of the base station detects that the user equipment is required to perform a handover;

or, the RRM of the user equipment is configured to send a handover request to the primary working area of the base station through the RRM of the base station when the RRM of the user equipment detects that the user equipment is required to perform a handover.

16. The system according to claim 13, wherein the RRM of the base station is configured to send a handover request to the primary working area of the base station when the RRM of the base station detects that the user equipment is required to perform a handover;

or, the RRM of the user equipment is configured to send a handover request to the primary working area of the base station through the RRM of the base station when the RRM of the user equipment detects that the user equipment is required to perform a handover.

17. The system according to claim 12, wherein the RRM of the base station is configured to send a handover request to the primary working area of the base station when the RRM of the base station detects that the user equipment is required to perform a handover;

or, the RRM of the user equipment is configured to send a handover request to the primary working area of the base station through the RRM of the base station when the RRM of the user equipment detects that the user equipment is required to perform a handover.

18. The system according to claim 11, wherein the RRM of the base station is configured to send a handover request to the primary working area of the base station when the RRM of the base station detects that the user equipment is required to perform a handover;

or, the RRM of the user equipment is configured to send a handover request to the primary working area of the base station through the RRM of the base station when the RRM of the user equipment detects that the user equipment is required to perform a handover.

* * * * *